United States Patent [19]
Reinhard

[11] Patent Number: 5,601,296
[45] Date of Patent: Feb. 11, 1997

[54] TOBOGGAN

[76] Inventor: Max Reinhard, Kirschblütenweg 7, D-61348 Bad Homburg, Germany

[21] Appl. No.: 519,712

[22] Filed: Aug. 28, 1995

[30] Foreign Application Priority Data

Sep. 9, 1994 [DE] Germany .............................. 9414628 U

[51] Int. Cl.$^6$ .................................................. B62B 15/00
[52] U.S. Cl. .............................................. 280/18; 280/22
[58] Field of Search .......................... 280/18, 19, 21.1, 280/22, 22.1, 845; 160/238

[56] References Cited

U.S. PATENT DOCUMENTS

| 3,484,801 | 12/1969 | Carlin | 280/18 |
| 4,046,393 | 9/1977 | Vadnais | 280/19 |

FOREIGN PATENT DOCUMENTS

| 7227797 | 11/1972 | Germany . |
| 7624354 | 2/1977 | Germany . |
| 7816760 | 9/1978 | Germany . |
| 3109993A1 | 10/1982 | Germany . |
| 8222153.7 | 11/1982 | Germany . |

*Primary Examiner*—Richard M. Camby
*Assistant Examiner*—Frank Vanaman
*Attorney, Agent, or Firm*—Griffin, Butler Whisenhunt & Kurtossy

[57] ABSTRACT

A toboggan comprises a sheet-like coilable gliding part of glidable material having a cross-bracing along its front region as viewed in the direction of gliding. A pair of support portions for the feet of a seated user of the toboggan is provided spaced from each other in the longitudianl direction of the cross-bracing. The cross-bracing and/or the foot support portions are provided with curved surfaces on the snow side similar to the curved front portion of a ski. The foot support portions are parts separately mountable on the cross-bracing swivable about the longitudinal axis thereof. In its rolled up condition the gliding part can be substantially accommodated in the cross-bracing.

11 Claims, 2 Drawing Sheets

TOBOGGAN

BACKGROUND OF THE INVENTION

The invention relates to a toboggan.

On a toboggan known from DE-U-76 24 354 its gliding part is a substantially rectangular thin mat which can be rolled up for transportation, a cross-bracing provided at one end of the mat serves together with a recess in the mat as a handle both for transportation and for holding on to when used in sport. This known toboggan permits control only to a limited extent, namely only by a shift in weight. A toboggan of similar structure and property is known from U.S. Pat. No. 40,46,393. The cross-bracing about which the mat may be rolled up is formed as a tube. From DE-U-78 16 760 a toboggan is known in conclusion, having a comparitively rigid gliding base foldable about longitudinal folding lines and skid regions provided hingeable along the side edges of the gliding base. The user of the toboggan in lying prone thereon is able to keep hold to a handle part and to control the toboggan by shifting his weight.

The invention is based on the object of providing a toboggan of the initially aforementioned kind having improved functionality and use, particularly as regards control, whilst improving the seating comfort.

SUMMARY

A toboggan includes a sheet-like (thin in comparison to its length and breadth) gliding part of glidable material which can be rolled up. The gliding part has an elongated cross bracing coupled to a front region thereof, with the front region being directed in a direction of gliding. The cross bracing is hollow for receiving the gliding part so that the gliding part can be rolled up in the cross bracing. A pair of support elements spaced apart from one another, are mounted along said cross bracing for feet of a user seated on a seat side of the sheet-like guiding part of the toboggan, opposite a snow side thereof. In a preferred embodiment, the cross bracing includes a tubular-shaped member having a longitudinal slit therein for receiving the gliding part. The sheet-like gliding part has a trapezoidal shape. Foot-region mounting devices are included for mounting the foot support elements to the cross bracing for allowing the foot support elements to be swivelable about a longitudinal axis of the cross bracing member.

Accordingly, along the cross-bracing, which in accordance with a preferred embodiment of the invention may be configured as a tubular member shaped similar to the curved end of a ski, supports are provided on which the user is able to support his feet, so that a force may be exerted on the cross-bracing via the feet of the user. This, on the one hand, improves the seating comfort of the toboggan, by the user being able to support himself at defined locations, unlike on the known toboggans. On the other, the particular advantage is achieved, that the toboggan can be distinctly controlled, by a greater force being exerted at the one foot support than at the other, resulting in the toboggan being moved to the one side or other. In addition, the foot supports enable, by the one or the other heel being moved somewhat in the snow, the control effect to be intensified or the gliding travel, when desired, to be decelerated or to be brought to a halt. One preferred embodiment of the invention provides for a handle being jointed to locations spaced away from each other laterally on the cross-bracing. In the seated position the user is able to hold tight to this handle. At the same time, this handle enables a higher force to be exerted on the cross-bracing which adds to the better control of the toboggan. To improve the straight-ahead running property of the toboggan the foot support regions and/or the gliding part may be shaped on the snow side e.g. in the form of ribs and the like oriented in the longitudinal directon. It is further preferred that the cross-bracing and the foot support regions have curved undersides similar to those at the curved end of a ski, so that use of the toboggan, particular in deep snow is substantially improved. The gliding part is preferably not configured, as on the known toboggans, as a rectangular mat, but has, in accordance with another embodiment as viewed from above, a roughly trapezoidal configuration, by a rear end region of the gliding part, as viewed in the direction of gliding, having a smaller transverse dimension than at the front end region as viewed in the direction of gliding. The rear end region may be upswept in the region of the posterior of the user up his back and e.g. secured e.g. clipped to the belt or a suspender-like arrangement of the user. This not only makes for added comfort of the user, it simultaneously effectively protects against chilling, particularly in the region of the kidneys. A further protection against chilling with simultaneous improvement of the seating comfort may be achieved by a thin cushion being provided at least in the region of the gliding part coming into contact with the user.

BRIEF DESCRIPTION OF THE DRAWINGS

The invention will now be explained in more detail on the basis of an embodiment and with reference to the drawing in which.

DESCRIPTION OF THE PREFERRED EMBODIMENT

Figure 1:
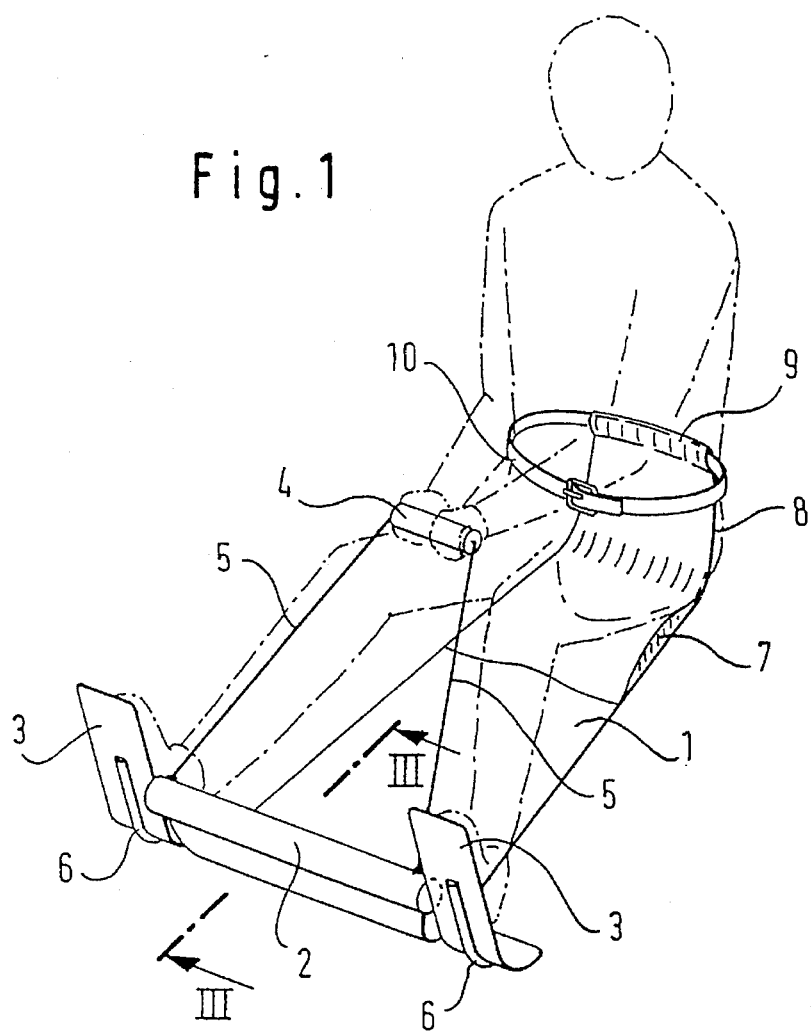
FIG. 1 is a perspective schematic overall view of a toboggan configured according to the invention with the user indicated dot-dashed.
Figure 2:
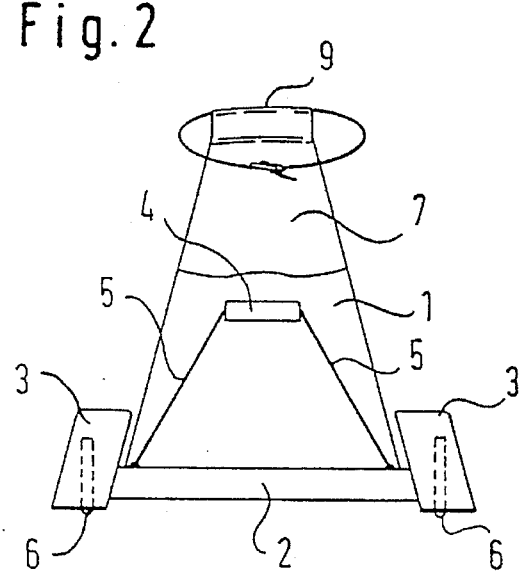
FIG. 2 shows the toboggan in a further simplified plan view.
Figure 3:
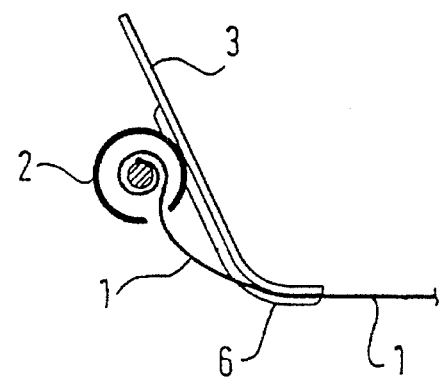
FIG. 3 is a detail view of the toboggan along the section line III—III in FIG. 1.
Figure 4:
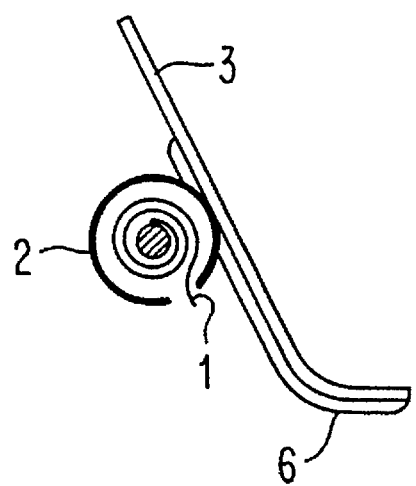
FIG. 4 is a view similar to FIG. 3, but with a gliding part accommodated in a cross bracing.

As illustrated, the toboggan comprises a gliding part 1 in the form of a mat or a cutting of web-like material having good gliding properties which substantially retains its elastic properties, particularly as regards adequate flexibility and tear-strength, at temperatures in the range of approx. +40° C. to −40° C. Although other suitable materials come into question, preferred materials are plastics, such as PTFE, PE, PP, PPN, PA, PVC, PET among others.

As viewed from above the gliding part 1 has preferably a roughly trapezoidal configuration, by the transverse dimension of the gliding part 1 at its front region as viewed in the direction of gliding, is larger than at its rear region. A cross-bracing in the form of a tube 2 is provided at the front region of the gliding part 1. Preferably the gliding part 1 is secured by means of a core member arranged rotatably therein, said gliding part 1 extending through a slot in the tube 2, so that a rotary force exerted on the core member causes the gliding part 1 to roll up about the core member. This rotary force may be exerted preferably by a coil spring acting on the core member or by means of a crank part applicable to the core member.

On each side of the tube 2 a rest or support 3 for the feet of the user is provided. These supports 3 are configured so that the user, if desired, is able to engage the snow deceleratingly by the heels of his feet. In addition the supports 3 are formed similar to the curved front end of a ski so that when the toboggan is used in deep snow there is no risk of the supports 3 ploughing under.

To improve the straight-ahead travel properties of the toboggan skid-like members or ribs 6 may be provided on the underside of the supports 3 oriented in the longitudinal direction. It is also possible that the supports 3 are configured keel-shaped.

In the embodiment of the invention shown the supports 3 are fixedly connected to the ends of the tube 2. However, they may also form separate parts which may be mounted on shaft-like bosses (not shown) at opposite ends of the tube 2 so that the supports 3 can be swivelled about the longitudinal axis of the tube 2.

Although the tube 2 in the embodiment shown has a circular cross-section, other cross-sectional configurations may also be provided. In particular, the tube 2 may represent a section part which has an underside curved like the curved front end of a ski which when actuated in deep snow prevents the tube 2 from ploughing under.

A handle 4 to which the user can hold himself during use is secured via a pair of flexible connecting members 5 in the form of e.g. wires, cables or the like to the tube 2 to locations spaced away from each other in the transverse direction. Preferably these connecting members 5 are secured in the vicinity of the supports 3 on tube 2.

As mentioned and as viewed in the direction of gliding, the gliding part 1 tapers trapezoidally to the rear end region on which the user is seated. To improve the seating comfort whilst creating simultaneously an insulation from the cold, a cushion 7 may be provided on the rear region in the form of a thickening of the material of the gliding part 1.

In addition, the gliding part 1 may be lengthened by an appendix region 8 adjoining the rear end or seating region. This appendix region 8 may be upswept in the region of the posterior of the seated user so that it covers part of his back. As indicated at 9, the appendix region 8 may be secured to a belt 10 of the seated user. Instead of the securement to a belt a suspender-type arrangement may also be provided at the appendix region 8.

The rear appendix region 8 of the gliding part 1 securable to the seated user may, if desired, be omitted or replaced by a suitable shaping of the cushion 7 such that the posterior of the seated user is provided with a support to the rear. Furthermore, the sectioning may be configured in such a way that it is flush with the outer surface of the tube 2 when the gliding part 1 is rolled up therein.

The undersurface of the gliding part 1 may be smooth. However, preferably, it is sectioned to improve the straight-ahead travel property of the toboggan, by one or more ribs or beads being provided oriented in the longitudinal direction. The thickness of the ribs or beads as well as that of the cushion 7 should be dimensioned such that the property of the gliding part 1, namely of permitting accommodation in the tube 2 like a roller-blind, is not substantially detrimented.

Controlling the toboggan is affected, on the one hand, by means of the force exerted on the supports 3 by the feet of the seated user, in holding himself to the handle 4, and, on the other, by shifting his weight from one side to the other of the toboggan. In the rolled-up condition the toboggan permits facilitated transportation, by allowing its outer dimensions to be reduced substantially to that of the tube 2 and the supports 3.

The invention has been described on the basis of preferred embodiments. It will be appreciated, however, that the protection of the invention exceeds the embodiments described and covers all and any combinations of the features of the claims both among one another and with features of the description failing to be cited expressly in the claims.

What is claimed is:

1. A toboggan comprising:

a gliding part being thin in comparison to its length and breadth and being made of glidable material, which can be rolled up, said gliding part having a front region near an edge directed in a direction of gliding;

an elongated cross-bracing coupled to the gliding part at the front region of the gliding part, wherein said cross bracing includes a hollow member means for receiving said gliding part so that said gliding part can be rolled up in the cross bracing; and wherein is further included a pair of foot-support means mounted on the cross bracing, spaced apart from one another for supporting feet of a user seated on a seat side of the gliding part of the toboggan, opposite a snow side of the gliding part.

2. A toboggan as in claim 1 wherein is further included a handle part coupled to said cross-bracing at locations spaced apart from one another along said cross bracing.

3. A toboggan as in claim 1 wherein said foot-support means have elongated relief members on snow sides thereof extending approximately perpendicular to the elongated cross bracing to improve travel properties of the toboggan.

4. A toboggan as in claim 1 wherein said hollow member means is a tubular-shaped member having a longitudinal slit therein for receiving the gliding part.

5. A toboggan as in claim 4 wherein at least one of said tubular-shaped member and said foot-support means are provided with upwardly curved surfaces on snow sides thereof.

6. A toboggan as in claim 1 wherein, when viewed from said seat side, said gliding part has a rear end region, opposite said front region, which has a smaller side-to-side dimension than a side-to-side dimension of the gliding part at the front region.

7. A toboggan as in claim 6 wherein there is a means at the rear end region of the gliding part for securing the rear end region to a back of a user seated on the toboggan.

8. A toboggan as in claim 1 wherein is further included a cushion on the seat side of the gliding part for supporting the user.

9. A toboggan as in claim 1 wherein is further included foot-element mounting means for separately mounting said foot-support means to said cross bracing for allowing said foot-support means to be swivelable about a longitudinal axis of said cross bracing.

10. A toboggan as in claim 1 wherein said gliding part has elongated relief members on the snow side thereof to improve a straight-line-travel property of the toboggan.

11. A toboggan as in claim 4 wherein said cross-bracing further includes a rotatable core inside said tubular-shaped member on which said gliding part can be rolled.

* * * * *